(12) United States Patent
Takeyama et al.

(10) Patent No.: US 10,301,995 B2
(45) Date of Patent: May 28, 2019

(54) WORK VEHICLE

(71) Applicant: KCM Corporation, Kako-gun, Hyogo (JP)

(72) Inventors: Takashi Takeyama, Ryuugasaki (JP); Hiroyuki Kizaki, Nagareyama (JP); Yoshihiro Itou, Ryuugasaki (JP)

(73) Assignee: KCM Corporation, Hyogo (JP)

( * ) Notice: Subject to any disclaimer, the term of this patent is extended or adjusted under 35 U.S.C. 154(b) by 143 days.

(21) Appl. No.: 15/451,474

(22) Filed: Mar. 7, 2017

(65) Prior Publication Data

US 2017/0284255 A1 Oct. 5, 2017

(30) Foreign Application Priority Data

Mar. 29, 2016 (JP) .................. 2016-066542

(51) Int. Cl.
*F01N 3/20* (2006.01)
*E02F 9/08* (2006.01)
(Continued)

(52) U.S. Cl.
CPC ............ *F01N 3/2066* (2013.01); *B60K 13/04* (2013.01); *E02F 9/0833* (2013.01); *E02F 9/0866* (2013.01); *F01N 3/103* (2013.01); *F01N 3/106* (2013.01); *F01N 3/108* (2013.01); *F01N 3/2839* (2013.01); *F01N 13/00* (2013.01); *F01N 13/009* (2014.06); *B60Y 2200/41* (2013.01); *B60Y 2200/411* (2013.01); *E02F 3/34* (2013.01); *F01N 2450/00* (2013.01); *F01N 2590/08* (2013.01); *F01N 2610/02* (2013.01); *Y02A 50/2325* (2018.01); *Y02T 10/24* (2013.01)

(58) Field of Classification Search
CPC .... F01N 13/00; F01N 13/009; F01N 2450/00; F01N 2590/08; F01N 2610/02; F01N 3/103; F01N 3/106; F01N 3/108; F01N 3/2066; F01N 3/2839; E02F 9/0833; E02F 9/0866

See application file for complete search history.

(56) References Cited

U.S. PATENT DOCUMENTS

| | | | |
|---|---|---|---|
| 9,267,267 B1* | 2/2016 | Kamimae | B60K 13/02 |
| 2010/0186381 A1* | 7/2010 | Charles | F01N 3/025 60/282 |
| 2013/0340417 A1* | 12/2013 | Morey | F01N 3/36 60/317 |

FOREIGN PATENT DOCUMENTS

JP 5526288 B1 6/2014

* cited by examiner

*Primary Examiner* — Thai Ba Trieu
*Assistant Examiner* — Diem T Tran
(74) *Attorney, Agent, or Firm* — Mattingly & Malur, PC

(57) ABSTRACT

An oxidation catalyst device is placed so that a central axis of the oxidation catalyst device may be oriented along a right and left direction of a work vehicle; a reducing agent injection device is placed so that a central axis of the reducing agent injection device may be oriented along a front and rear direction of the work vehicle; and a selective catalytic reduction device is placed so that a central axis of the selective catalytic reduction device may be oriented along the front and rear direction of the work vehicle, in which the oxidation catalyst device, the reducing agent injection device, and the selective catalytic reduction device are arranged so as to have a relationship that the central axes thereof become the same in height, and the central axis of the selective catalytic reduction device is placed so as to pass through the oxidation catalyst device.

4 Claims, 14 Drawing Sheets

(51) Int. Cl.
*F01N 3/10* (2006.01)
*F01N 3/28* (2006.01)
*B60K 13/04* (2006.01)
*F01N 13/00* (2010.01)
*E02F 3/34* (2006.01)

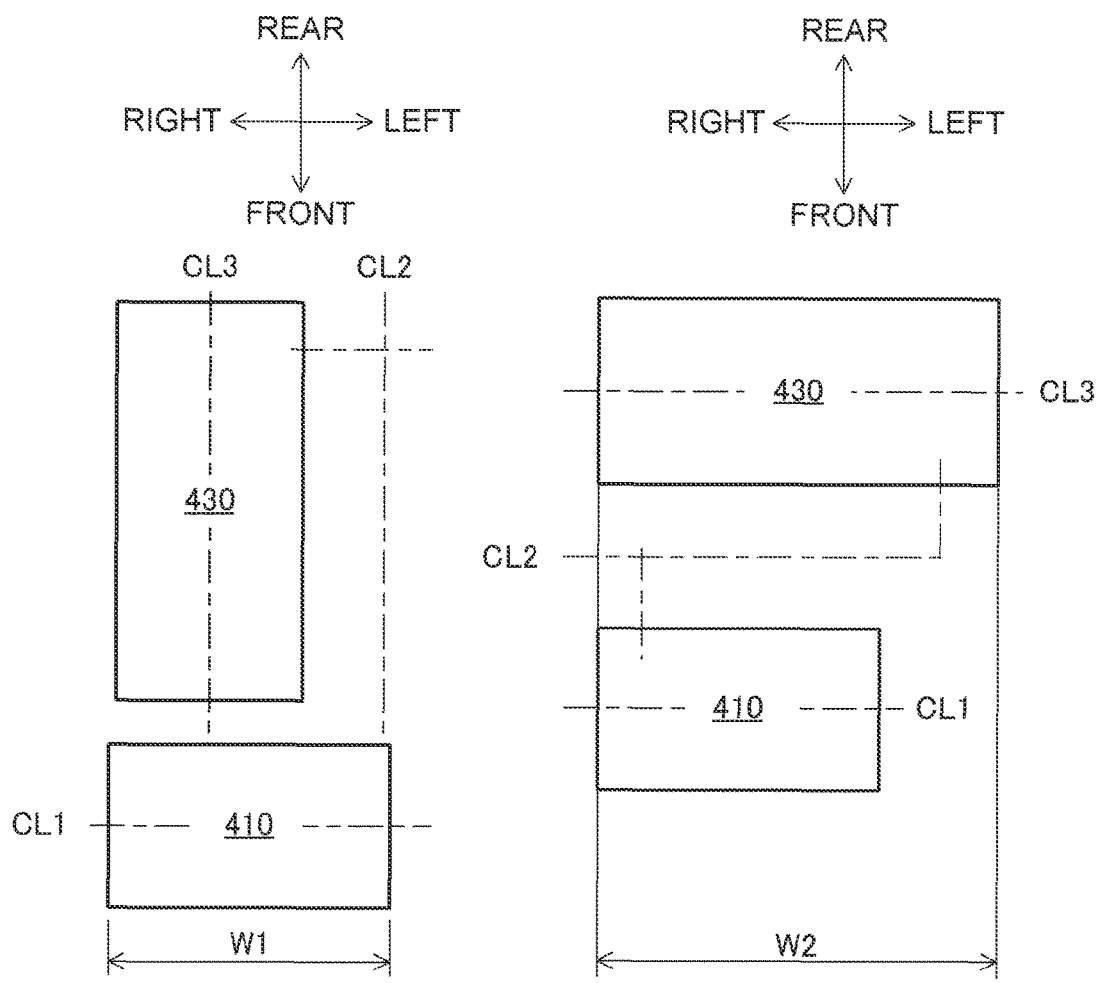

WORK VEHICLE

BACKGROUND

1. Field of the Invention

The present invention relates to a work vehicle.

2. Description of Related Art

A work vehicle having an exhaust gas purifying device for removing nitrogen oxide (NOx) in exhaust gas is known (refer to Japanese Patent No. 5526288). In the work vehicle described in Japanese Patent No. 5526288, a diesel particulate collecting filter device and a nitrogen oxide reduction catalyst device are arranged in parallel. The diesel particulate collecting filter device and the nitrogen oxide reduction catalyst device are connected by an S-shaped connecting pipe in which a mixing device of aqueous solution of urea is provided.

SUMMARY

When a post-processing device, such as a diesel particulate collecting filter device, and a post-processing device, such as a nitrogen oxide reduction catalyst device, are arranged in parallel like a description in Japanese Patent No. 5526288, if one of longitudinal lengths of the two post-processing devices is longer than that of the other, a dimension of an engine compartment in a right and left direction will be decided by adjusting it to the longer dimension. That is, with the arrangement of Patent document 1, there is a possibility that a right and left width of the engine compartment will become larger.

A work vehicle according to one mode of the present invention is a work vehicle that has an engine and an exhaust gas purifying device for purifying exhaust gas of the engine in the engine compartment, in which the exhaust gas purifying device is placed above the engine and has a cylindrical oxidation catalyst device, a cylindrical reducing agent injection device, and a cylindrical selective catalytic reduction device; and the oxidation catalyst device is placed so that a central axis of the oxidation catalyst device may be oriented along the right and left direction of the work vehicle; the reducing agent injection device is placed so that a central axis of the reducing agent injection device may be oriented along a front and rear direction of the work vehicle; the reducing agent injection device is placed so that a central axis of the reducing agent injection device may be oriented along the front and rear direction of the work vehicle; the oxidation catalyst device, the reducing agent injection device, and the selective catalytic reduction device are arranged so as to have a relationship that the central axes thereof become the same in height; and the selective catalytic reduction device is placed so that its central axis may pass through the oxidation catalyst device.

BRIEF DESCRIPTION OF THE DRAWINGS

According to one aspect of the present invention, it is possible to shorten the right and left width of the engine compartment.

BRIEF DESCRIPTION OF THE DRAWINGS

Figure 1:
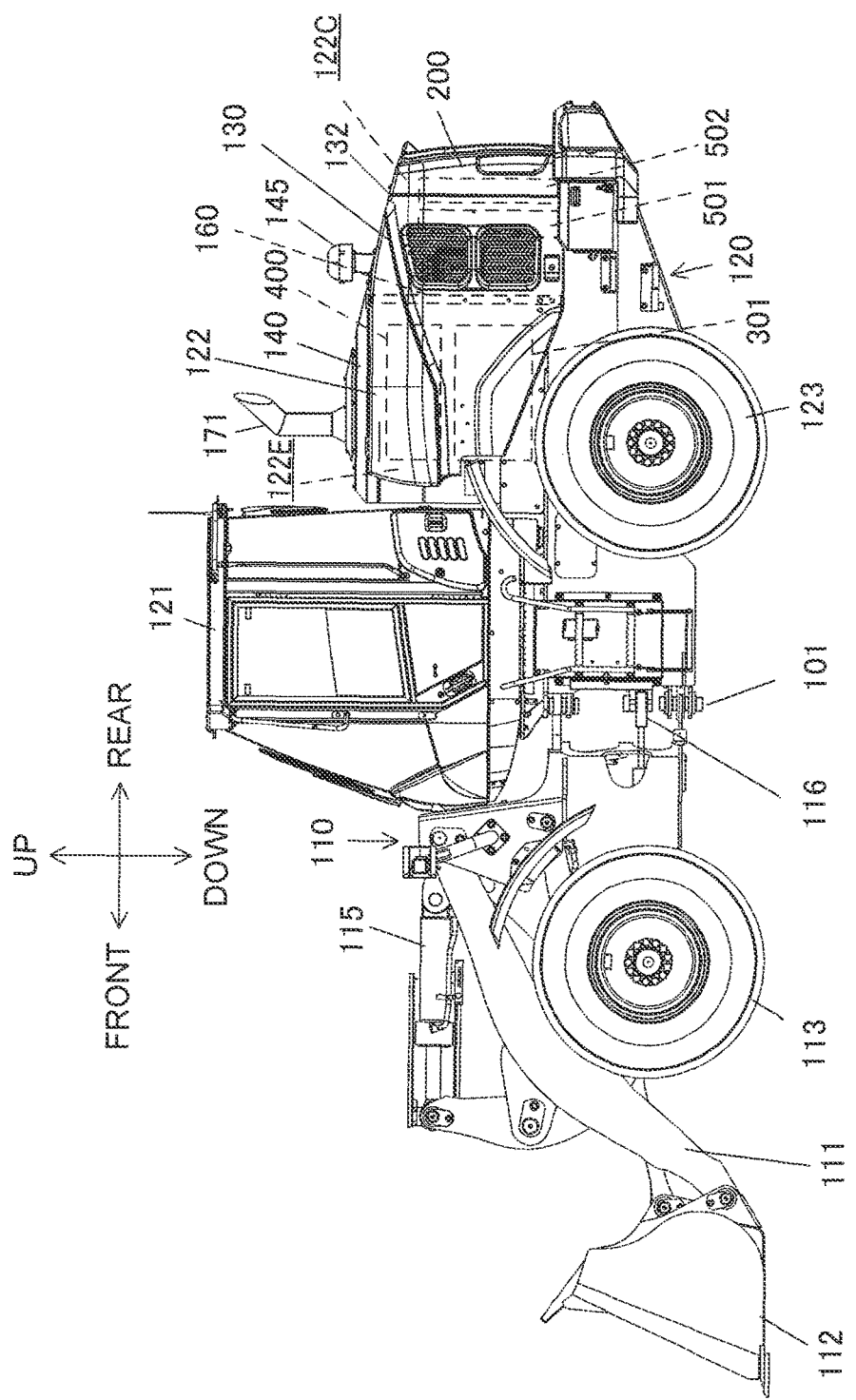
Figure 2:
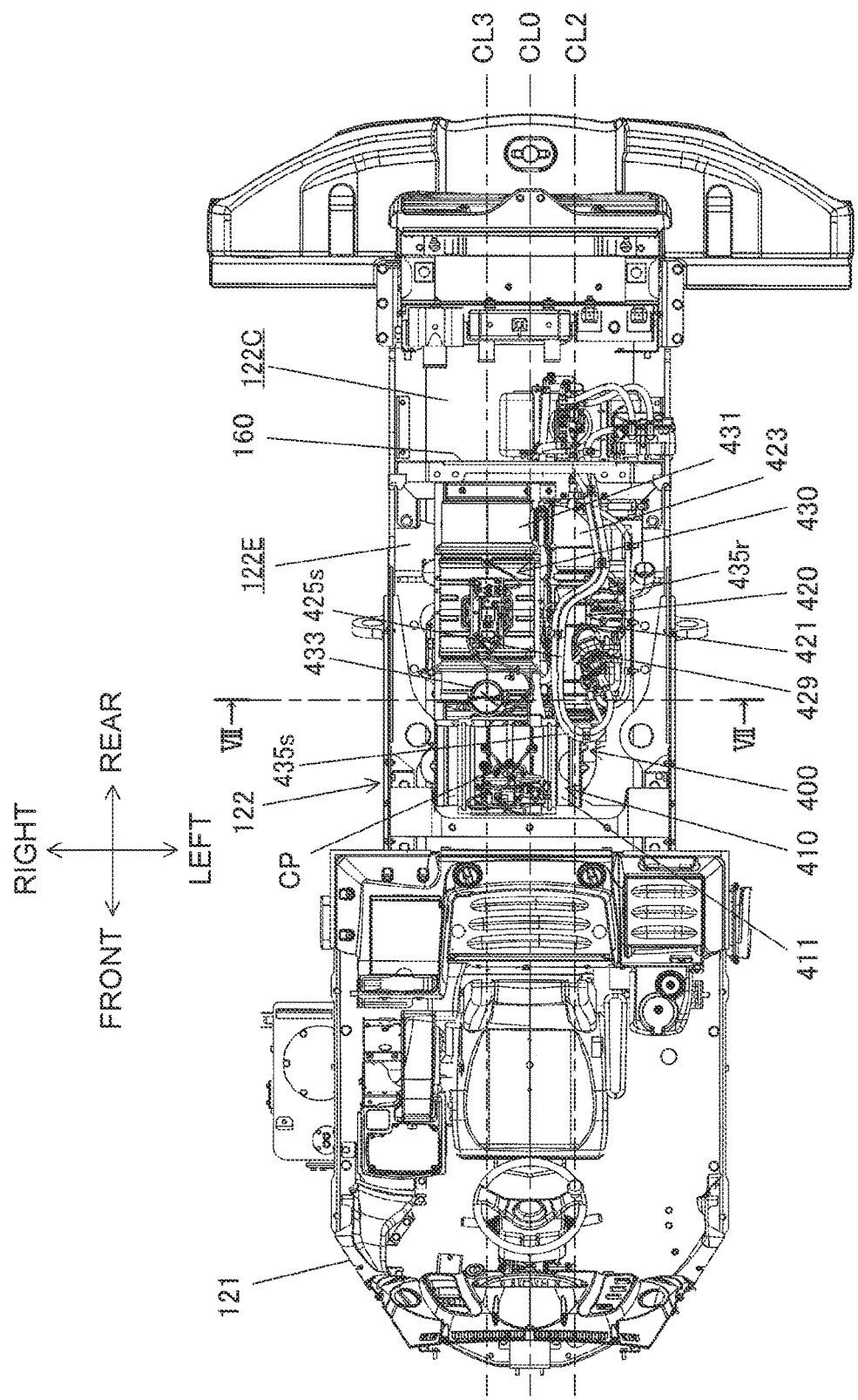
Figure 3:
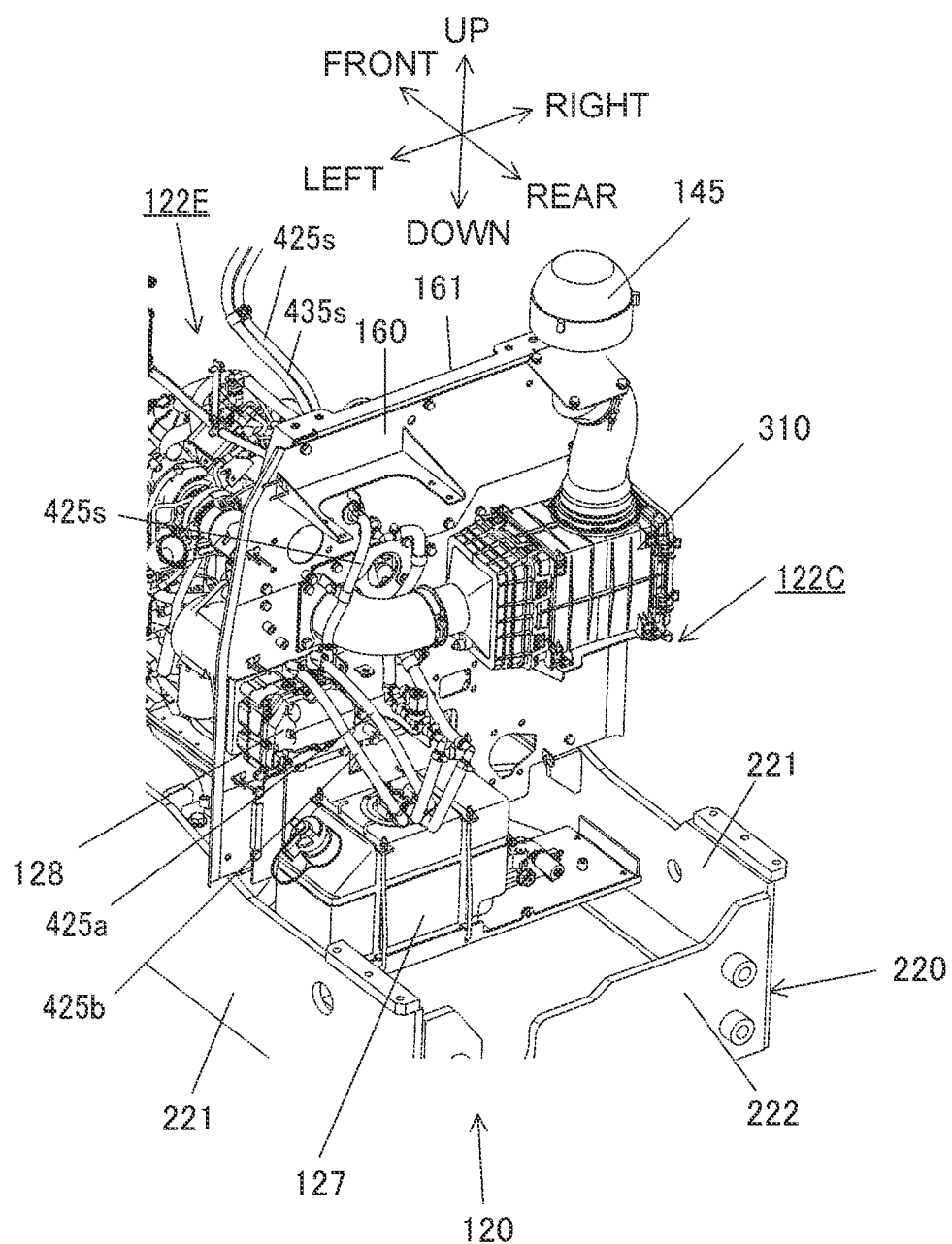
Figure 4:
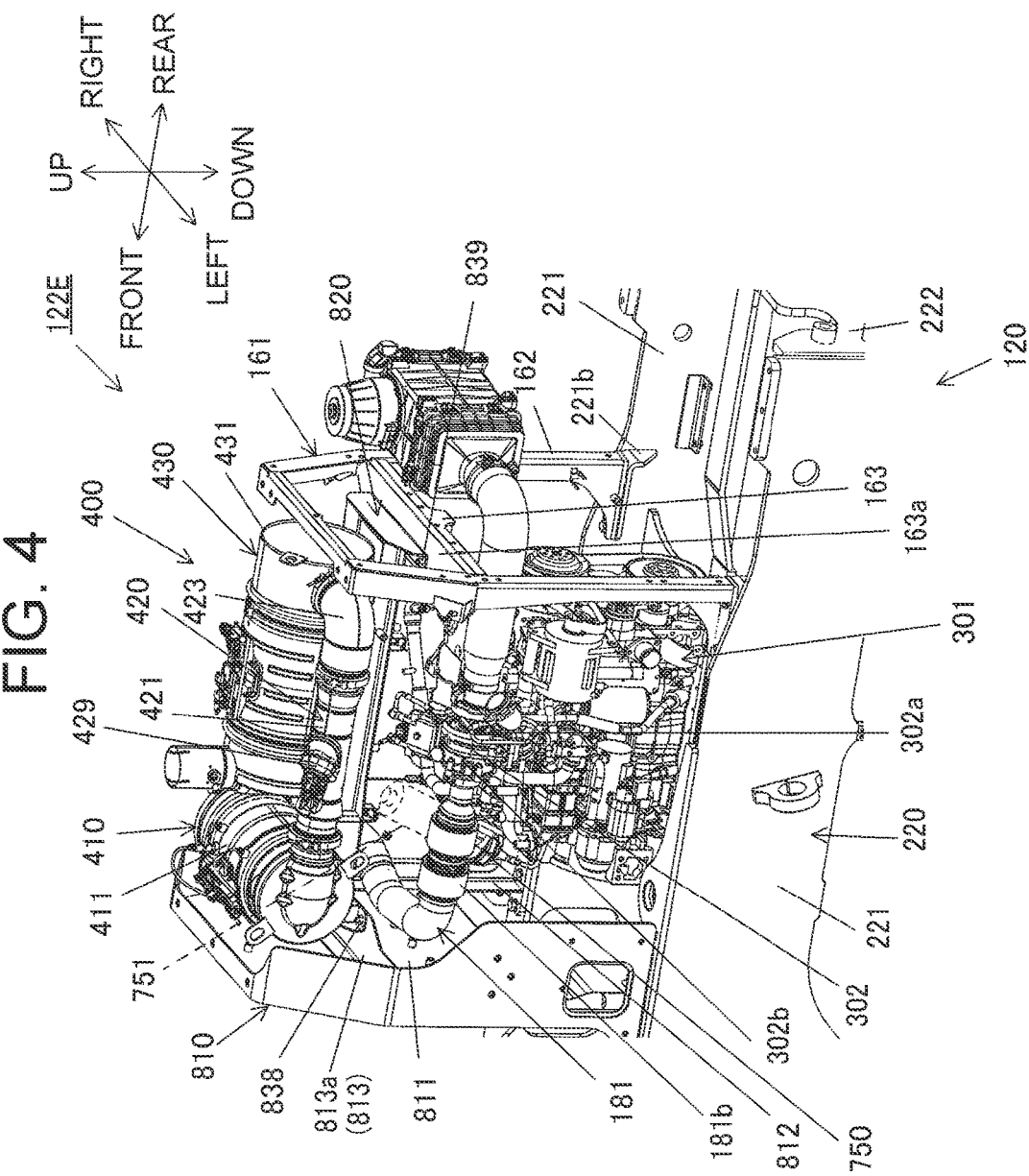
Figure 5:
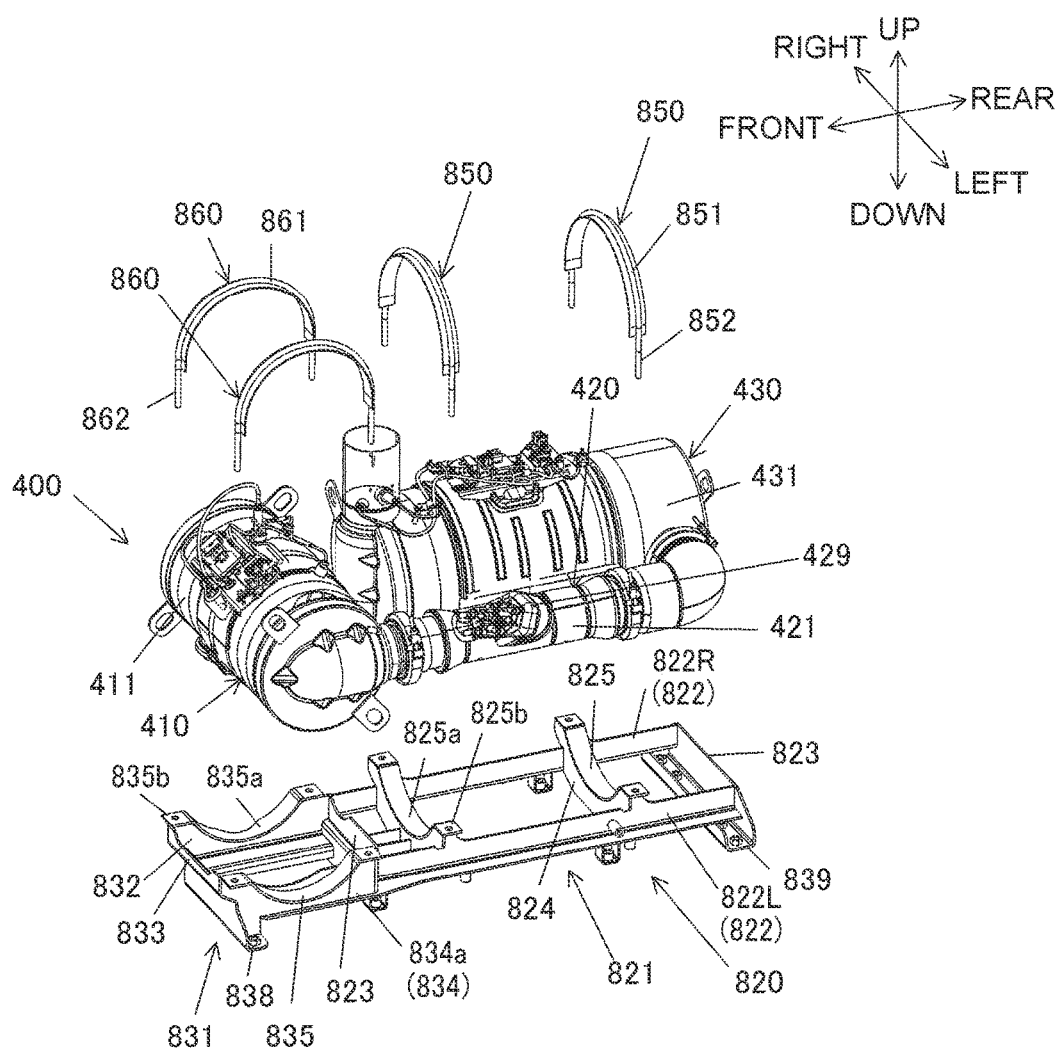
Figure 6:
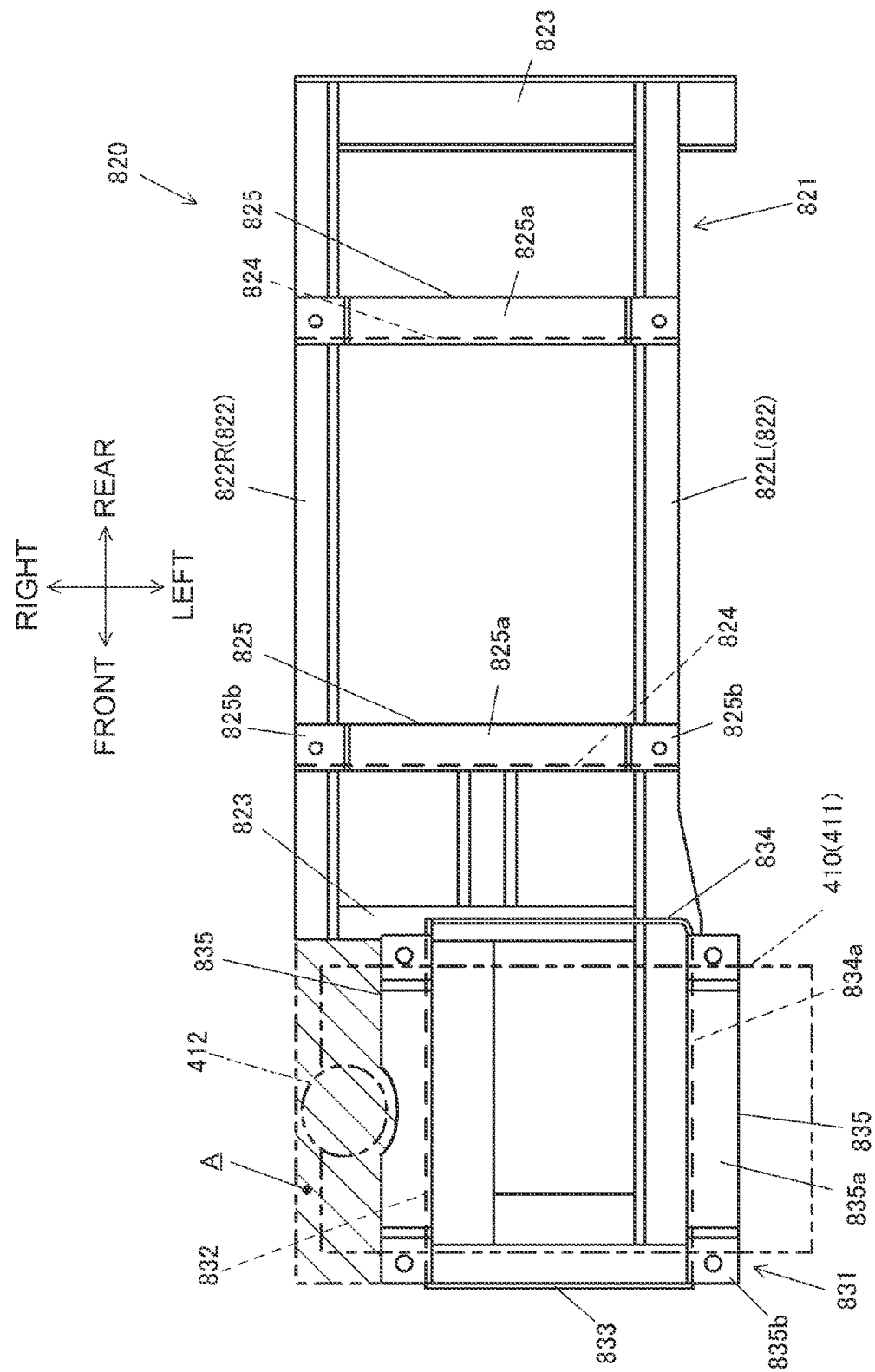
Figure 7A:
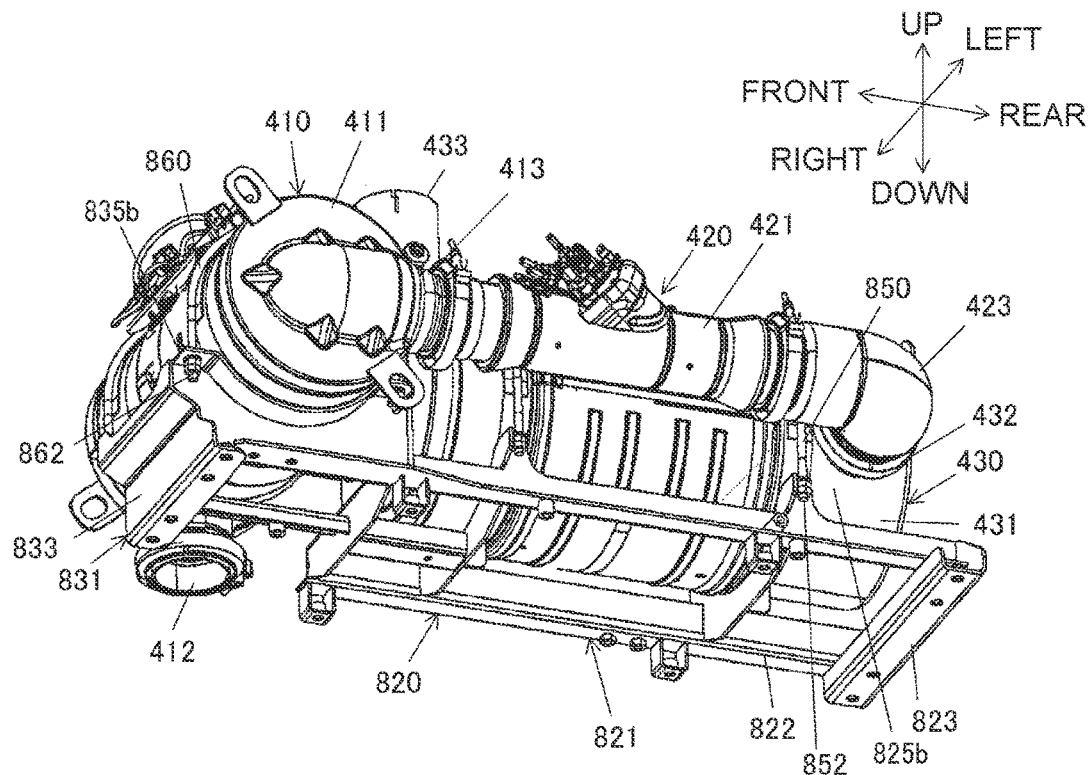
Figure 7B:
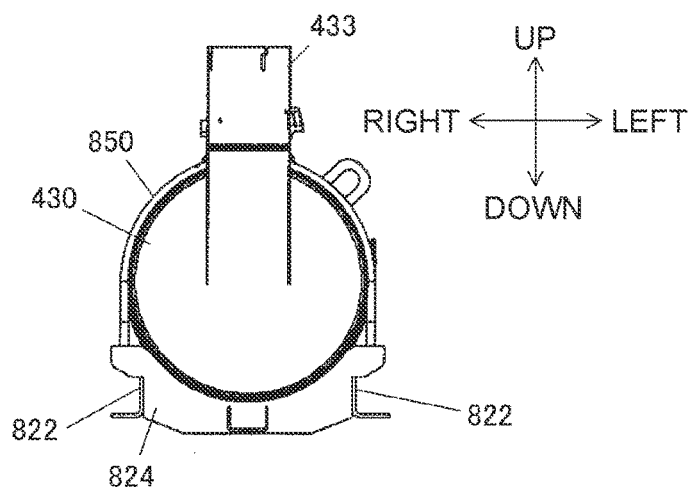
Figure 8:
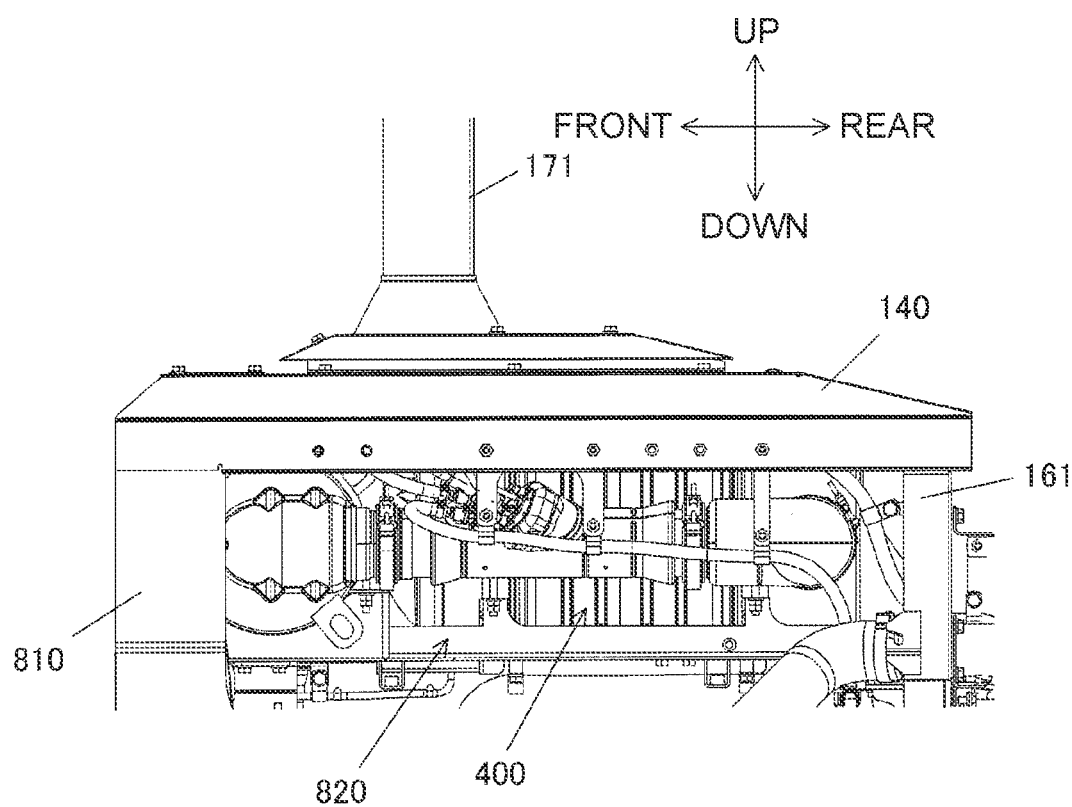
Figure 9B:
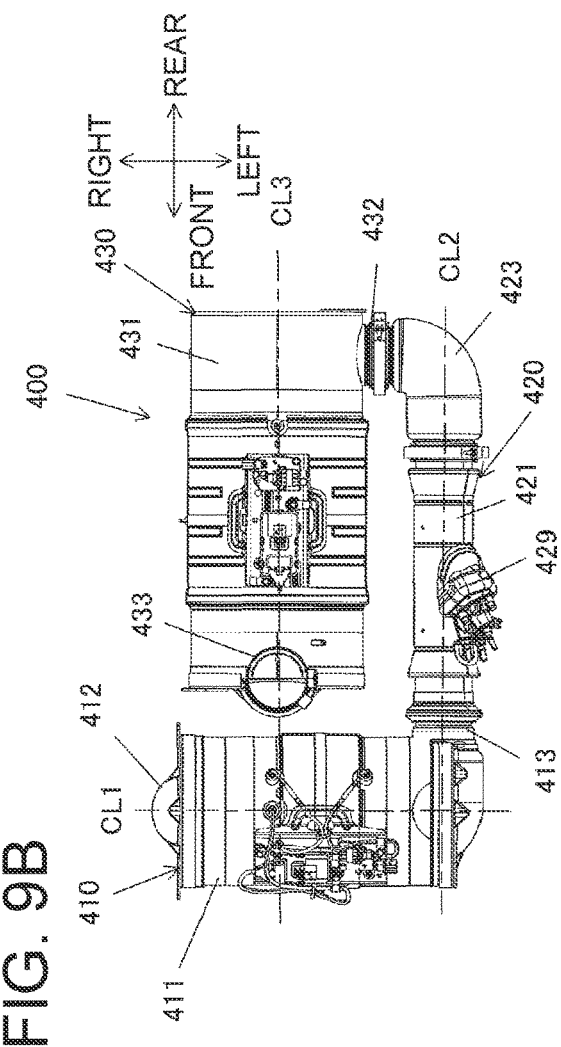
Figure 9A:
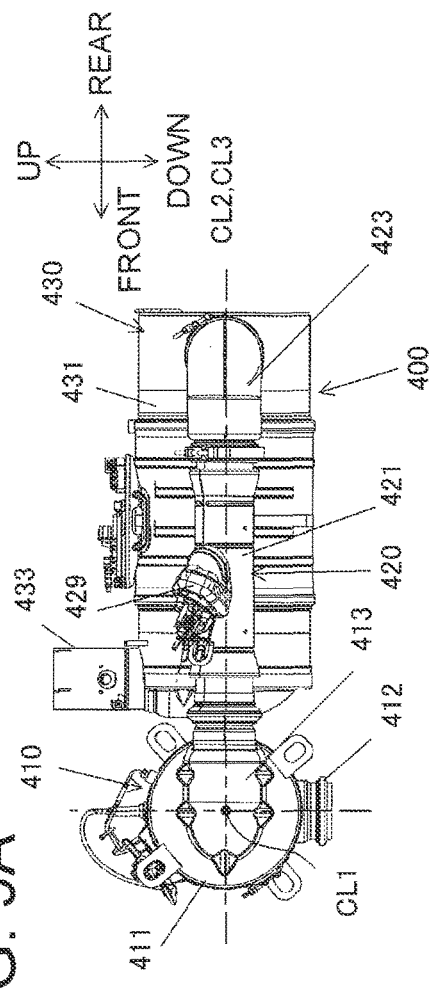
Figure 9C:
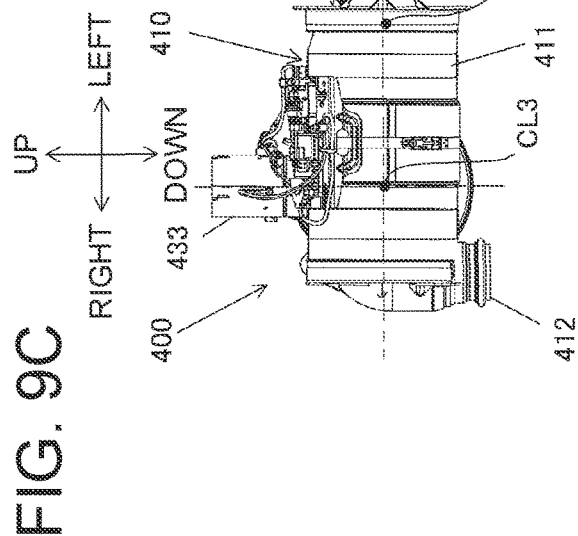
Figure 10:
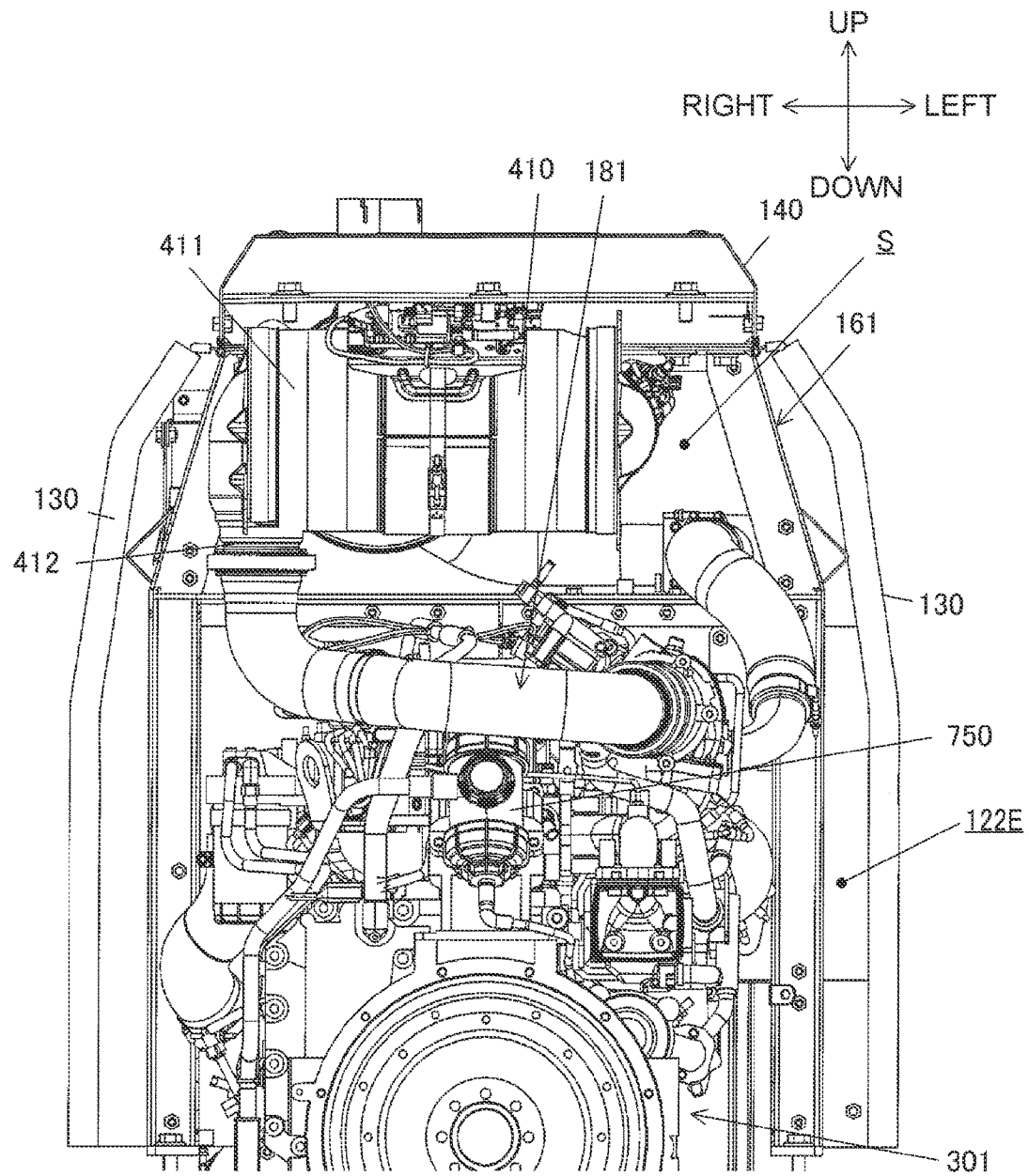
Figure 11:
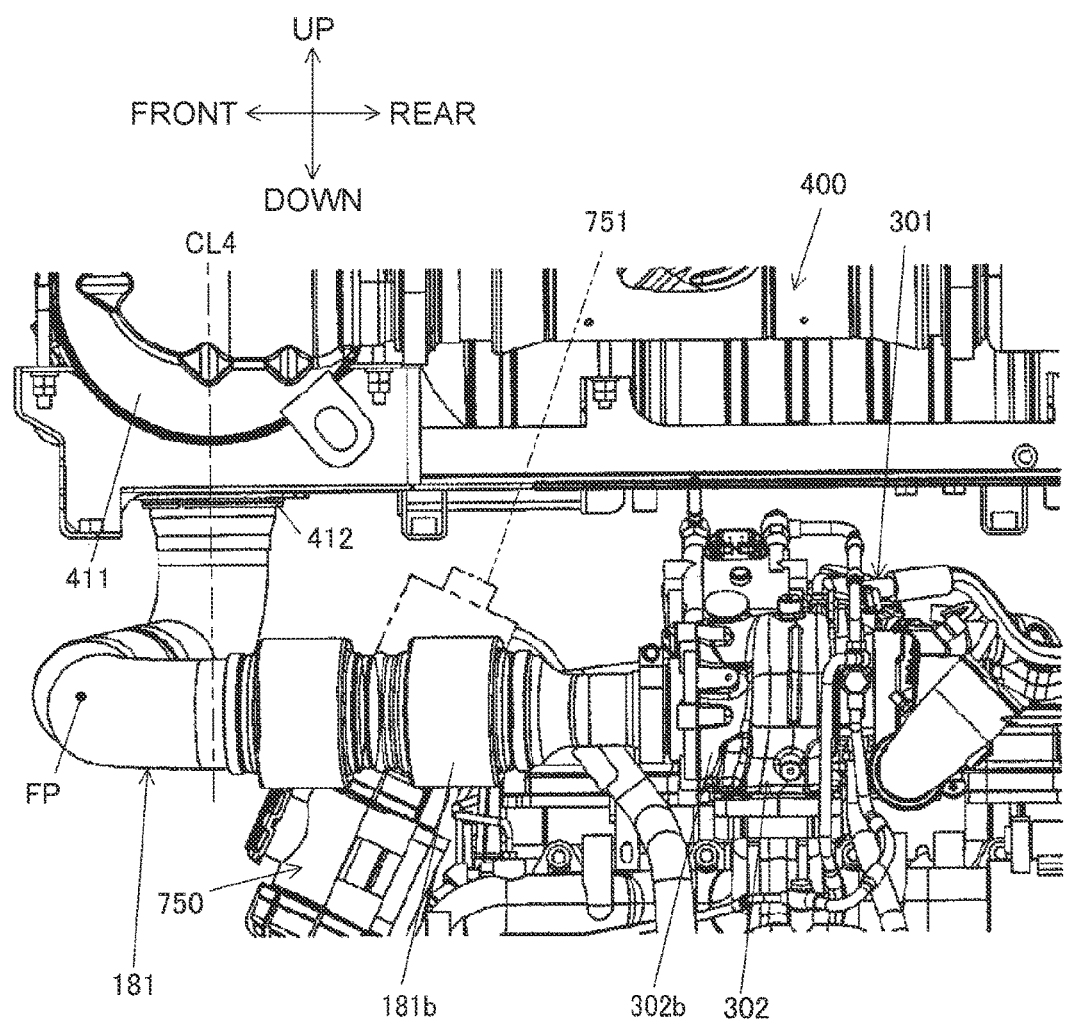
Figure 12:
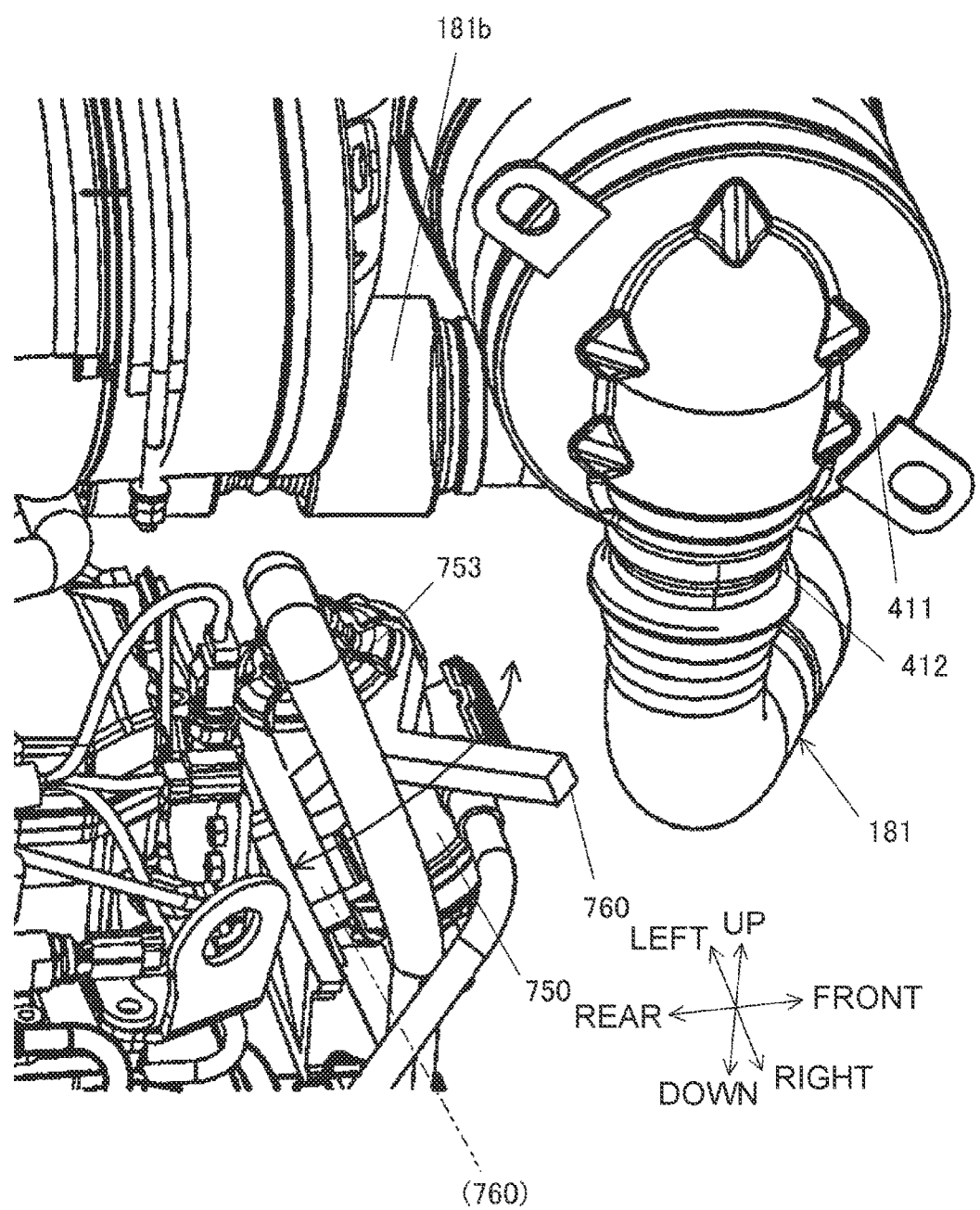
Figure 13:
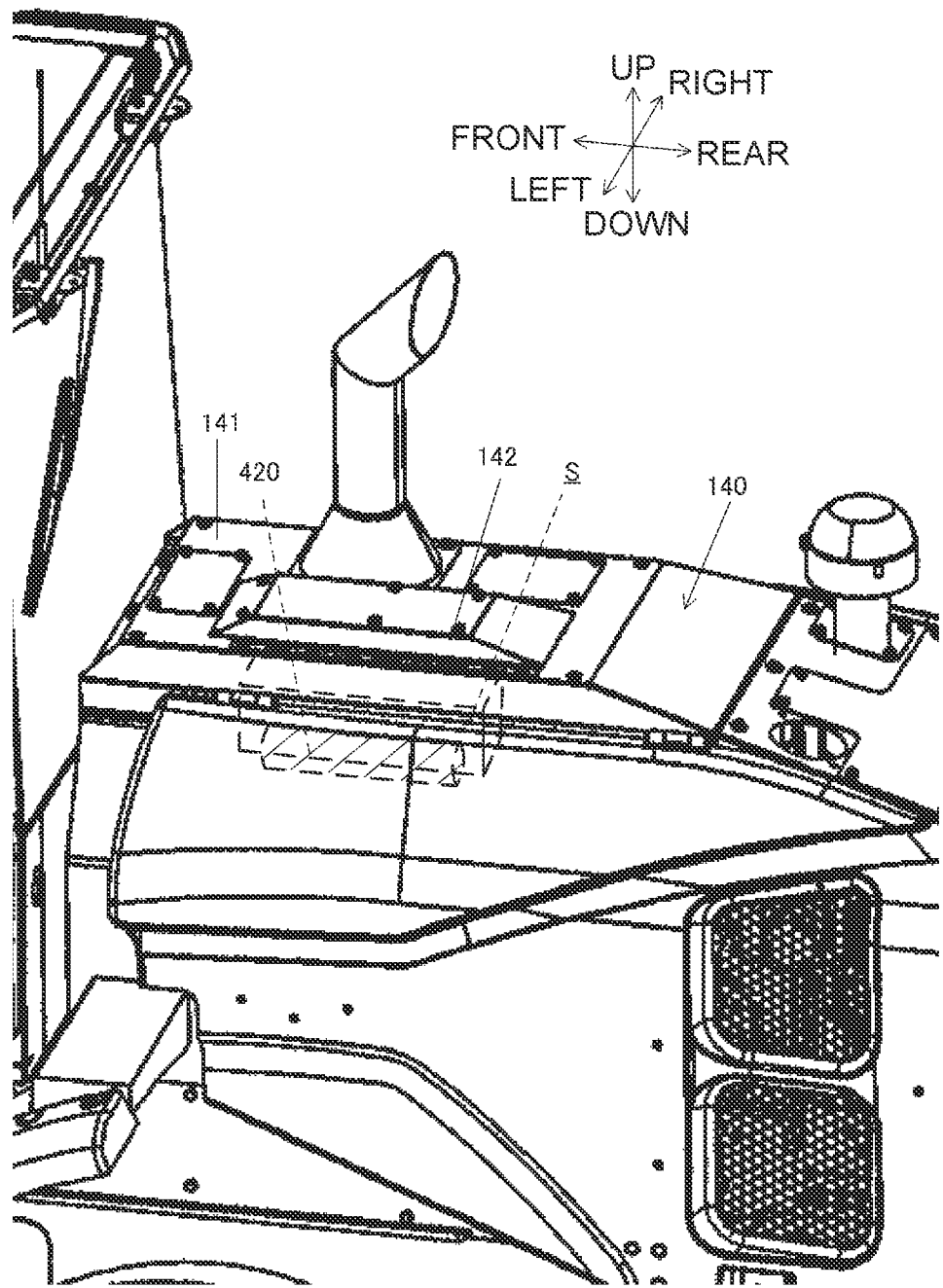

FIG. 1 is a side view of a wheel loader;
FIG. 2 is a plan view of the wheel loader with an upper structure body, such as a top board, removed;
FIG. 3 is a perspective view showing an inside of a cooler compartment;
FIG. 4 is a perspective view showing an inside of an engine compartment;
FIG. 5 is an exploded perspective view for explaining a fixation structure of an exhaust gas purifying device;
FIG. 6 is a schematic plan view of a base bracket;
FIG. 7A is a perspective view of the exhaust gas purifying device fixed to the base bracket when viewed from the lower side, and FIG. 7B is a schematic cross-sectional view cut along a line VII-VII of FIG. 2;
FIG. 8 is a view of the engine compartment when viewed from its left side;
FIGS. 9A to 9C are diagrams for explaining an arrangement of post-processing devices of which the exhaust gas purifying device is included;
FIG. 10 is a view of the engine compartment when viewed from its front;
FIG. 11 is a diagram show a drawing-out region of a filter;
FIG. 12 is a diagram for a work of drawing out the filter;
FIG. 13 is a perspective view of a building when viewed diagonally from the upper left; and
FIGS. 14A and 14B are schematic plan views for explaining a dimension of an exhaust gas purifying device 400 in a right and left direction.

DETAILED DESCRIPTION

Hereinafter, one embodiment of a work vehicle by the present invention is described with reference to drawings. For convenience of the explanation, in this embodiment, a front and rear direction, a right and left direction, and an up and down direction are prescribed as indicated in respective diagrams. Moreover, in this embodiment, for a member that needs to omit a description for the explanation among members of which the work vehicle is included, the description of a part or the whole of it is omitted.

FIG. 1 is a side view of a wheel loader that is one example of the work vehicle according to the one embodiment of the present invention. As shown in FIG. 1, the wheel loader is configured with an arm 111, a bucket 112, a front vehicle body 110 having front wheels 113 etc., an operator cab 121, a building 122, and a rear vehicle body 120 having rear wheels 123, etc.

The arm 111 revolves (makes elevating motion) in the up and down direction by driving of an arm cylinder (unillustrated); the bucket 112 revolves (makes cloud or dump) in the up and down direction by driving of a bucket cylinder 115. The front vehicle body 110 and the rear vehicle body 120 are rotatably linked with a center pin 101, and the front vehicle body 110 bends right and left to the rear vehicle body 120 by expansion and contraction of a steering cylinder 116.

The building 122 constitutes an outline of a housing chamber that houses an engine 301, an exhaust gas purifying device 400, a heat exchanger, various hydraulic devices, etc. Openings of right and left side faces of the building 122 are covered with one pair of right and left building covers 130 that are openable and closable. The building cover 130 is a gull-wing-type opening and closing cover, and is configured to be able to develop virtually horizontally to the ground with a revolving fulcrum (hinge) provided between a top board of the building 122 and the building cover 130. The building covers 130 provided on right and left side faces of a wheel loader 100 are of an approximately left-right symmetric shape.

FIG. 2 is a plan view of the wheel loader in a state where an upper structure body, such as of the top board, is removed. As shown in FIG. 2, in the building 122, an accommodation room (accommodation space) provided in the inside thereof is divided into the engine compartment 122E on the front side of the vehicle and the cooler compartment 122C on the rear side of the vehicle by a partition wall 160.

As shown in FIG. 1, side faces of the engine compartment 122E are covered with parts of the building covers 130, and a top face of the engine compartment 122E is covered with an engine hood 140 of which the top board of the building 122 is included. A front face of the engine compartment 122E is covered with a front face plate 811 (refer to FIG. 4) of a front side frame 810, and a rear face of the engine compartment 122E is covered with the partition wall 160 (refer to FIG. 3) of a rear side frame 161. That is, the engine compartment 122E is defined by a part of the one pair of right and left building covers 130, the engine hood 140, the front face plate 811 (refer to FIG. 4), and the partition wall 160 (refer to FIG. 3).

A side face of the cooler compartment 122C is covered with a part of the building cover 130, and a top face of the cooler compartment 122C is covered with a building cover 132 for cooler of which the top board of the building 122 is comprised. A front face of the cooler compartment 122C is covered with the partition wall 160, and a rear face of the cooler compartment 122C is covered with a grill 200. That is, the cooler compartment 122C is defined by a part of the one pair of right and left building covers 130, the building cover 132 for cooler, the partition wall 160, and the grill 200.

In an inside of the cooler compartment 122C, a heat exchanger unit 501 and a cooling fan unit 502 are arranged. The heat exchanger unit 501 has multiple heat exchangers, such as a radiator for cooling water of the engine, an oil cooler for cooling hydraulic fluid, an intercooler for cooling air that is pressurized by a turbocharger of the engine 301, and a radiator frame for supporting these heat exchangers. The cooling fan unit 502 has a cooling fan for generating cooling wind for cooling the heat exchanger unit 501 and a shroud for supporting the cooling fan. Incidentally, depending on a model of the wheel loader, heat exchangers, such as a transmission oil cooler and a capacitor of an air-conditioner for air-conditioning the operator cab 121, are also attached to the heat exchanger unit 501.

As shown in FIG. 1, from the top face of the building cover 132 for cooler, a suction pipe 145 for taking in air required for driving the engine 301 from the outside through an air cleaner 310 (refer to FIG. 3) is protruding. As shown in FIG. 3, the air cleaner 310 is provided immediately after the partition wall 160 in the cooler compartment 122C. The air cleaner 310 is connected to the engine 301 through suction piping. By providing the air cleaner 310 in the cooler compartment 122C, an influence of heat from the engine 301 and the exhaust gas purifying device 400 on the air cleaner 310 can be suppressed. This enables to suppress a temperature rise of air inhaled by the engine 301 and thereby inhibit degradation of a suction efficiency of the engine 301.

As shown in FIG. 1, the exhaust gas purifying device 400 is a device for purifying exhaust gas of the engine 301, and is arranged above the engine 301 in the engine compartment 122E. From the engine hood 140, a tail pipe 171 for discharging the exhaust gas is protruding.

FIG. 3 is a perspective view showing the inside of the cooler compartment 122C, and FIG. 4 is a perspective view showing an inside of the engine compartment 122E. In FIG. 3 and FIG. 4, illustrations of the building cover 130, the engine hood 140, and the building cover 132 for cooler, the grill 200, etc. of which the building 122 is included are omitted.

As shown in FIG. 4, the engine 301 is attached to an engine attaching bracket that is not illustrated and is in the rear vehicle body 120 in the engine compartment 122E. A supercharger (turbocharger) 302 is attached to the engine 301. The turbocharger 302 is arranged so that an air inlet of a compressor 302a may face the back and an exhaust port of a turbine 302b may face the front.

As shown in FIG. 2 and FIG. 4, the exhaust gas purifying device 400 has an oxidation catalyst device (DOC: Diesel Oxidation Catalyst) 410 that is installed in an exhaust flow passage of the engine 301, a reducing agent injection device (DRT: Decomposition Reactor Tube) 420, and a selective catalytic reduction device (SCR: Selective Catalytic Reduction) 430. Along the flow of the exhaust gas, the oxidation catalyst device 410, the reducing agent injection device 420, and the selective catalytic reduction device 430 are arranged in this order from the upstream side.

The oxidation catalyst device 410 has oxidation catalyst for oxidizing and removing nitric monoxide (NO), carbon monoxide (CO), hydrocarbon (HC), etc. contained in the exhaust gas, and a cylindrical DOC housing 411 for holding the oxidation catalyst. An inlet 412 (refer to FIGS. 7A and 7B and FIGS. 9A to 9C) of exhaust gas is protruding on the lower part of the one end of the DOC housing 411 in the axial direction, and an outlet 413 (refer to FIGS. 7A and 7B and FIGS. 9A to 9C) of the exhaust gas is protruding in the rear near the other end thereof in the axial direction. The reducing agent injection device 420 is provided on the downstream side of the oxidation catalyst device 410.

The reducing agent injection device 420 has an injection valve 429 for injecting aqueous solution of urea (hereafter described as urea water) that is a reducing agent and a cylindrical DRT housing 421 for holding the injection valve 429. The injection valve 429 is provided in a roughly central part of the DRT housing 421. The injection valve 429 injects the urea water into the DRT housing 421 in response to a control signal from an unillustrated control unit. The injection valve 429 opens and closes a valve body by flowing a current through a coil to generate magnetic flux in a magnetic circuit containing a needle and a core and thereby exerting a magnetic attraction power that draws the needle to the core side, and has the same configuration as that of a well-known fuel injection valve (injector) of an electromagnetic drive type. The selective catalytic reduction device 430 is provided on the downstream side of the reducing agent injection device 420.

The selective catalytic reduction device 430 has a reduction catalyst of reducing and purifying nitrogen oxide (NOx) contained in the exhaust gas using the urea water as the reducing agent and a cylindrical SCR housing 431 for holding the reduction catalyst. In the selective catalytic reduction device 430, the oxidation catalyst is provided on the downstream side of the reduction catalyst. An inlet 432 (refer to FIGS. 7A and 7B and FIGS. 9A to 9C) of the exhaust gas is protruding on one end of the SCR housing 431 in its axial direction to its left, and an outlet 433 (refer to FIGS. 7A and 7B and FIGS. 9A to 9C) of exhaust gas is protruding on the other end thereof in the axial direction above it. A tip of the outlet 433 of the exhaust gas of the SCR housing 431 is inserted into a lower part of the tailpipe 171 (refer to FIG. 1) attached to the engine hood 140.

One end of the reducing agent injection device 420 in the axial direction is connected to the inlet 432 of the exhaust gas of the SCR housing 431 through a 90-degree elbow 423, and the other end of the reducing agent injection device 420 in the axial direction is connected to the outlet 413 of the exhaust gas of the DOC housing 411.

As shown in FIG. 3, the injection valve 429 is connected to a urea water tank 127 through the piping (suction piping 425a and reducing agent supply piping 425s). The urea water tank 127 is a container for storing the urea water as the reducing agent. A urea water pump 128 is provided between the injection valve 429 in the engine compartment 122E and the urea water tank 127 in the cooler compartment 122C. The urea water pump 128 is being fixed to the partition wall 160 in the inside of the cooler compartment 122C. The urea water pump 128 is an electric pump that sucks up the urea water in the urea water tank 127 and supplies the urea water to the injection valve 429.

The injection valve 429 shown in FIG. 4 injects the urea water supplied from the urea water tank 127 by the urea water pump 128 into the exhaust flow passage. When the urea water is injected, ammonia is generated from the urea water by the reduction catalyst of the selective catalytic reduction device 430, then NOx in the exhaust gas performs reduction reaction by ammonia, and NOx is decomposed into water and nitrogen. Ammonia in the exhaust gas is decreased in amount by the oxidation catalyst provided on a downstream side of the reduction catalyst in the selective catalytic reduction device 430.

As shown in FIG. 4, the inlet 412 of the exhaust gas of the oxidation catalyst device 410 and the exhaust port of the turbine 302b of the turbocharger 302 are connected with an exhaust pipe 181. A vibration absorbing bellows 181b is provided in the exhaust pipe 181. The bellows 181b is of a bellows structure and its weight per unit length is large compared with piping of the downstream side of the bellows 181b. For this reason, the bellows 181b is preventing vibration from being amplified by being fixed to a position close to a connection part (exhaust port) with the turbine 302b and being placed slantingly to a central axis of the turbocharger 302 that is extended in the front and rear direction.

As shown in FIG. 3 and FIG. 4, a rear frame 220 of which the rear vehicle body 120 is included is configured with one pair of right and left vertical plates 221 and a lateral plate 222 that links the one pair of right and left vertical plates 221 by each of its front end and rear end (a lateral plate of the front end is not illustrated), to be of a rectangular frame shape.

As shown in FIG. 4, the exhaust gas purifying device 400 is fixed to a base bracket 820 that is a supporting structure body. FIG. 5 is an exploded perspective view for explaining a fixation structure of the exhaust gas purifying device 400, and FIG. 6 is a schematic plan view of the base bracket 820. As shown in FIG. 5 and FIG. 6, the base bracket 820 has a first base 821 of a rectangular frame shape and a second base 831 of a rectangular frame shape.

The first base 821 has one pair of right and left vertical frame parts 822 that is extended in the front and rear direction, one pair of front and rear linking frame parts 823 for linking both front and rear ends of the one pair of left and right vertical frame parts 822, one pair of support frame parts 824 that is fixed to the one pair of right and left vertical frame parts 822, and one pair of front and rear cylinder receiving parts 825 that is fixed to respective parts of the one pair of front and rear support frame parts 824. A left side vertical frame part 822L among the one pair of right and left vertical frame parts 822 is protruding forward compared with a right side vertical frame part 822R.

The second base 831 has a transverse linking part 833 that is fixed to a front end of the vertical frame part 822L on the left side of the first base 821 and is extended from the fixed portion to the right side, a longitudinal linking part 832 that is fixed to a right end of the transverse linking part 833 and is extended from the fixed portion to the rear, an L-shaped frame part 834 in the form of the letter L in plain view whose one end is fixed to a rear end of the longitudinal linking part 832 and whose other end is fixed to a left end of the transverse linking part 833, and one pair of right and left cylinder receiving parts 835 that are fixed to the longitudinal linking part 832 and a left side plate 834a of the L-shaped frame part 834, respectively.

Incidentally, parts of which the first base 821 and the second base 831 are comprised are formed with an angle (angle steel) whose cross section is the form of the letter L, a channel (channel steel) whose cross section is the form of the letter U, a steel material that is processed by bending a flat plate, etc.

As shown in FIG. 6, the base bracket 820 has an open ceiling structure such that its open area is larger than an area where members are arranged in a region surrounded by outer edges in plan view. Parts of which the base bracket 820 is included are coupled together to be one body by welding etc. in advance.

In the cylinder receiving part 825 provided as one pair, its both ends are suspended by the one pair of left and right longitudinal frames (vertical frame parts 822L, 822R), respectively. The cylinder receiving part 825 has an arc-shaped concave part 825a to which the lower end face of the SCR housing 431 is abutted and one pair of fixing pieces 825b protruding to the outside at apex parts of both ends of the concave part 825a. In the fixing piece 825b, an insertion hole to which a point part of a clamp member 850 (refer to FIG. 5) described later is inserted is provided.

Similarly, in the cylinder receiving parts 835 provided as one pair, its both ends are suspended by one pair of upper and lower transverse frames (parts of the transverse linking part 833 and the L-shaped frame part 834), respectively. The cylinder receiving part 835 has an arc-shaped concave part 835a to which a lower end face of the DOC housing 411 is abutted and one pair of fitting pieces 835b protruding to the outside at apex parts of both ends of the concave part 835a. An insertion hole into which a point of a clamp member 860 (refer to FIG. 5) described later is inserted is provided in the fitting piece 835b.

As shown in FIG. 5, fore legs 838 are provided on a front end of the base bracket 820, and rear legs 839 are provided on a rear end of the base bracket 820. The fore leg 838 is formed by performing bend processing on the lower end of the transverse linking part 833, and the rear leg 839 is formed by performing bend processing on the lower end of the linking frame part 823 on the rear side. A nut is welded to each of the fore legs 838 and the rear legs 839, and each member is made ready for a bolt to be attached thereon from the lower side.

The clamp member 850 is in the form of the letter U, and has an abutting part 851 to be pressed against an upper end face of the SCR housing 431 and shaft parts 852 that are extended from both ends of the abutting part 851. A male screw part to which a nut is to be screwed is formed in the shaft part 852. Similarly, the clamp member 860 is in the form of the letter U, and has an abutting part 861 to be pressed against the upper end face of the DOC housing 411 and shaft parts 862 that are extended from both ends of the abutting part 861. A male screw part to which a nut is to be screwed is formed in the shaft part 862.

By the DOC housing 411 being mounted on the cylinder receiving part 835 of the second base 831 and by the SCR housing 431 being mounted on the cylinder receiving part 825 of the first base 821, the exhaust gas purifying device 400 is supported by the base bracket 820. In this state, the clamp members 850, 860 are fitted to the base bracket 820.

FIG. 7A is a perspective view of the exhaust gas purifying device 400 fixed to the base bracket 820 when viewed from the lower side. By screwing a nut into the male screw part in a state where the clamp member 860 is pressed against the DOC housing 411 and the shaft part 862 is made to pass through the insertion hole of the fitting piece 835b, the oxidation catalyst device 410 can be fixed to the second base 831. By screwing a nut into the male screw part in a state where the clamp member 850 is pressed against the SCR housing 431 and the shaft part 852 is made to pass through the insertion hole of the fitting piece 825b, the selective catalytic reduction device 430 can be fixed to the first base 821. Thereby, the exhaust gas purifying device 400 is fixed with the base bracket 820.

FIG. 7B is a schematic cross-sectional view cut along a line VII-VII of FIG. 2. As shown in FIG. 7B, the SCR housing 431 is supported by the cylinder receiving part 825 that has the arc-shaped concave part 825a. A lowest position of the concave part 825a is located under apex parts of the vertical frame part 822. That is, the SCR housing 431 is held in a form that sinks into the base bracket 820. Similarly, the DOC housing 411 is supported by the cylinder receiving part 835 that has the arc-shaped concave part 835a. A lowest position of the concave part 835a is located under apex parts of the linking frame part 823 and the transverse linking part 833. That is, the DOC housing 411 is held in a form that sinks into the base bracket 820. This attains shortening of a dimension of the exhaust gas purifying device unit that is composed of the exhaust gas purifying device 400 and the base bracket 820 in the up and down direction.

As shown in FIG. 4, the exhaust gas purifying device unit is supported by the front side frame 810 and the rear side frame 161. The rear side frame 161 is being fixed to the vertical plates 221 through the brackets 221b welded to the inside of the one pair of right and left vertical plates 221 of which the rear frame 220 is included. The rear side frame 161 is a gate-shaped support member, and one pair of right and left legs 162 is attached to each of the one pair of right and left vertical plates 221. A support beam 163 that is extended to a right and left horizontal direction is being adhered to the one pair of right and left legs 162. A protrusion receiving part 163a protruding forward is provided on the support beam 163. Incidentally, as shown in FIG. 3, the plate-shaped partition wall 160 described above is attached to a rear face of the rear side frame 161 with fastening members, such as bolts and nuts.

As shown in FIG. 4, the front side frame 810 is set to have the same configuration as that of the rear side frame 161. The front side frame 810 is being fixed to the one pair of left and right vertical plates 221 of which the rear frame 220 is included. The front side frame 810 is a gate-shaped support member, and one pair of right and left legs 812 is attached to each of the one pair of right and left vertical plates 221. A support beam 813 that is extended to the right and left horizontal direction is being adhered to the one pair of right and left legs 812. The protrusion receiving part 813a protruding to the rear is provided on the support beam 813. Incidentally, on the front face of the front side frame 810, the plate-shaped front face plate 811 is attached with fastening members, such as bolts and nuts.

The fore legs 838 of the base bracket 820 are mounted on the protrusion receiving part 813a of the front side frame 810, and the rear legs 839 of the base bracket 820 are mounted on the protrusion receiving part 163a of the rear side frame 161. When the fore leg 838 is fixed to the protrusion receiving part 813a with a bolt and a nut and the rear leg 839 is fixed to the protrusion receiving part 163a with a bolt and a nut, the base bracket 820 is being fixed to and supported by the front side frame 810 and the rear side frame 161.

FIG. 8 is a view of the engine compartment 122E when viewed from the left side. In FIG. 8, an illustration of the building cover 130 is omitted. As shown in FIG. 8, a front end of the engine hood 140 is attached to an upper end of the front side frame 810, and a rear end of the engine hood 140 is attached to an upper end of the rear side frame 161. That is, the front side frame 810 and the rear side frame 161 are supporting structure bodies that support the front end and the rear end of the engine hood 140 of which the top board of the engine compartment 122E is included.

Thus, by a configuration that the exhaust gas purifying device 400 is fixed to the base bracket 820 and the base bracket 820 is fixed to the front side frame 810 and the rear side frame 161, the exhaust gas purifying device 400 is placed and fixed at a predetermined position above the engine 301.

FIGS. 9A to 9C are diagrams for explaining an arrangement of post-processing devices of which the exhaust gas purifying device 400 is included. FIG. 9A is a view of the exhaust gas purifying device 400 when viewed from the left side, and FIG. 9B is a view of the exhaust gas purifying device 400 when viewed from the above. FIG. 9C is a view of the exhaust gas purifying device 400 when viewed from the front. As shown in FIG. 2 and FIGS. 9A to 9C, the oxidation catalyst device 410 is placed so that a central axis CL1 of the DOC housing 411 may be oriented along the right and left direction of the vehicle. The reducing agent injection device 420 is placed so that a central axis CL2 of the DRT housing 421 may be oriented along the front and rear direction of the vehicle. The selective catalytic reduction device 430 is placed so that a central axis CL3 of the SCR housing 431 may be oriented along the front and rear direction of the vehicle.

As shown in FIGS. 9A to 9C, all of the central axis CL1 of the oxidation catalyst device 410, the central axis CL2 of the reducing agent injection device 420, and the central axis CL3 of the selective catalytic reduction device 430 are arranged so as to have a relationship of forming the same virtual plane that is in parallel to the horizontal ground surface, i.e., a relationship that the central axes thereof become the same in height.

The oxidation catalyst device 410, the reducing agent injection device 420, and the selective catalytic reduction device 430 are arranged so that both the central axis CL2 of the reducing agent injection device 420 and the central axis CL3 of the selective catalytic reduction device 430 may pass through the DOC housing 411 of the oxidation catalyst device 410.

As shown in FIG. 9C, the exhaust gas purifying device 400 is configured so that the reducing agent injection device 420 may overlap the oxidation catalyst device 410 when viewed from the front of the vehicle. Moreover, the exhaust gas purifying device 400 is configured so that the selective catalytic reduction device 430 may overlap the oxidation catalyst device 410 when viewed from the front of the vehicle. By adopting such an arrangement, dimensions of the exhaust gas purifying device 400 in the up and down direction and in the right and left direction can be shortened.

FIG. 10 is a view of the engine compartment 122E when viewed from the front. In FIG. 10, an illustration of the base bracket 820 is omitted. As shown in FIG. 10, the blowby gas reducing device 750 is provided in the engine 301. Blowby gas is non-combusted gas that leaked out from an interspace between a piston and a cylinder of the engine 301 into a crankcase, is returned to an engine suction system from the crankcase, and is sent to a combustion chamber again. A blowby gas reducing device 750 has a filter for removing mist form lubricating oil (oil mist) when returning the blowby gas to the suction system. The filter is a part that needs to be exchanged periodically (for example, once per an operation integration time of 2000 hours).

FIG. 11 is a view of the engine compartment 122E when viewed from the left direction, and is a diagram showing a drawing-out region 751 of the filter. As shown in FIG. 4 and FIG. 11, the drawing-out region 751 of the filter of the blowby gas reducing device 750 is set in a space between the blowby gas reducing device 750 and the exhaust gas purifying device 400. A drawing-out margin is decided to be about 190 to 210 mm, for example, which secures about 70 to 100 mm as a margin of allowing a hand. It is desirable for a dimension of the drawing-out region 751 in the up and down direction to secure 240 mm or more.

In this embodiment, as described above, a dimension of the exhaust gas purifying device 400 in the up and down direction can be shortened. For this reason, the lower end of the exhaust gas purifying device 400 can be located upward compared with a case, for example, where the reducing agent injection device 420 is placed above the oxidation catalyst device 410. That is, a space between the engine 301 and the exhaust gas purifying device 400 can be widened. As a result, the drawing-out region 751 of the filter of the blowby gas reducing device 750 can be set between the exhaust gas purifying device 400 and the blowby gas reducing device 750.

FIG. 12 is a diagram for explaining a work of drawing out the filter. As shown in FIG. 11, the exhaust pipe 181 that connects the inlet 412 of the exhaust gas of the oxidation catalyst device 410 and the turbine 302b of the turbocharger 302 extends ahead from the turbocharger 302, and bends to the right side near the front face plate 811. As shown in FIG. 12, after the exhaust pipe 181 bent to the right side near the front face plate 811 is bent diagonally backward right, it is bent upward to be connected to the inlet 412 of the exhaust gas of the oxidation catalyst device 410. As shown in FIG. 11, a foremost part FP of a center path of the exhaust pipe 181 is located on the further front side of the vehicle than a central axis CL4 of the inlet 412 of the oxidation catalyst device 410. By routing the exhaust pipe 181 so that it may go around the blowby gas reducing device 750, a sufficient work space can be secured on the periphery of the blowby gas reducing device 750.

In this embodiment, an interspace that allows at least a finger of human hand to enter (for example, about 40 mm) is formed between the exhaust pipe 181 and the blowby gas reducing device 750. Since when the exhaust pipe 181 is too long, the temperature of the exhaust gas falls and processing capability in the exhaust gas purifying device 400 declines, it is usually considered that the exhaust pipe 181 is connected with the blowby gas reducing device 750 in a shortest distance. However, in this embodiment, improvement in workability is aimed at by daringly placing the exhaust pipe 181 to go around the blowby gas reducing device 750.

Using this work space, a worker can remove a lid 753 of the blowby gas reducing device 750 by revolving a tool 760, such as a wrench, and draw out the filter. In this embodiment, a revolving margin of 90 degrees or more is secured for the wrench.

As shown in FIG. 2, the selective catalytic reduction device 430 is placed so that the central axis CL3 of the SCR housing 431 may be located on the right side of a central axis CL0 of the vehicle. Incidentally, the central axis CL0 of the vehicle is a central axis of the vehicle that extends over the front and the rear of the vehicle and divides a right and left width of the vehicle into two parts, indicating a straight line that connects a center of one pair of right and left rear wheels 123 and a center of one pair of right and left front wheels 113 when the vehicle is in a posture of moving straight forward.

The oxidation catalyst device 410 is placed so that a center CP of a right and left width direction may be located on the right side of the central axis CL0 of the vehicle. That is, the exhaust gas purifying device 400 is placed being shifted to the right side of the vehicle. As shown in FIG. 10, this enables to secure a large space S in a left side top corner of the engine compartment 122E. As shown in FIG. 2, in this space S, the followings are arranged: the reducing agent supply piping 425s that leads the urea water to the injection valve 429, cooling water supply piping 435s that leads the cooling water of the engine 301 to the injection valve 429, and return piping 435r that returns the cooling water to the engine 301. Since a volume of the space S is large, flexibility of routing of piping, such as the reducing agent supply piping 425s, the cooling water supply piping 435s, and the return piping 435r, can be improved.

FIG. 13 is a perspective view of the building 122 when viewed diagonally from the upper left. As shown in FIG. 13, an opening cover 142 covering a rectangular opening of the engine hood 140 is provided on the engine hood 140. The opening cover 142 is one that is of a square frustum shape with its lower side opened that is formed by processing a planar member. An opening whose area is smaller than the opening cover 142 is provided on a ceiling board 141 of which the engine hood 140 is comprised, and an upper part of the opening is covered with the opening cover 142. An interspace is formed between an outer edge lower end of the opening cover 142 and the ceiling board 141, and is configured to be capable of discharging air in the engine compartment 122E to the outside.

In this embodiment, the opening cover 142 of the engine hood 140 is located on the left side of the central axis CL0 of the vehicle. A position of the opening cover 142 of the engine hood 140 is located directly above both the space S described above and the reducing agent injection device 420. Air whose temperature has risen in the engine compartment 122E is discharged to the outside of the vehicle from the opening of the engine hood 140. Since the space S is located above a path of a flow of air (flow passage) that is discharged from the inside of the engine chamber 122E to the outside by free convention, this flow of air enables to cool the reducing agent supply piping 425s, the cooling water supply piping 435s, and the return piping 435r that are routed in the space S.

As shown in FIG. 6, a space A of a rectangular parallelepiped shape is provided on the front right side of the base bracket 820. In this embodiment, the right side vertical frame part 822R has a shorter length in the front and rear direction than the left side vertical frame part 822L. The left side vertical frame part 822L is also located under the oxidation catalyst device 410, and the front end of the vertical frame part 822L is located near the front end of the oxidation catalyst device 410. In contrast, the front end of the right side vertical frame part 822R is located behind the oxidation catalyst device 410.

The cylinder receiving part 835 on the right side of the second base 831 is located on the left side of the inlet 412 so as not to interfere the inlet 412 of the exhaust gas of the oxidation catalyst device 410. Incidentally, in this embodiment, apart of the cylinder receiving part 835 is cut in an arc-shape to avoid interference with the inlet 412. As is illustrated, a rectangular-shaped space A is a region defined by an imaginary line drawn by elongating the right-side edge part of the vertical frame part 822R on the right side of the first base 821 to the forward in plan view, an imaginary drawn by elongating the front end of the transverse linking part 833 of the second base 831 to the right, a right end of the second base 831, and a front end of the first base 821.

In this embodiment, in order to provide this space A, the base bracket 820 is not given a rectangular shape in plain view, but given a rectangular shape from which a right front corner part is cut away. Thereby, when attaching the oxidation catalyst device 410 to the base bracket 820, a space for a work of screwing together a nut to the male screw part of the clamp member 860 (refer to FIG. 5 and FIGS. 7A and 7B) from the lower side can be secured widely, which enables to easily perform the fixing work. Moreover, a removal work can also be performed easily.

Not by arranging a member that interferes the fixing work and the removing work of nuts near the inlet 412 of the exhaust gas of the oxidation catalyst device 410, it is possible to improve the workability. In this embodiment, the base bracket 820 is configured not to allow any object acting as a cover to exist within a range of 50 mm or less in the surrounding of a connection part of the inlet 412 of the exhaust gas of the oxidation catalyst device 410 and the exhaust pipe 181. Incidentally, by enlarging a range in which any object acting as a cover is not allowed to exist, the workability is improved. Regarding the range in which the cover is not allowed to exist, it is suitable to secure a range larger than or equal to about 40 to 50 mm, for example.

The oxidation catalyst device 410 and the selective catalytic reduction device 430 are temporarily fixed to the base bracket 820 that was formed as one body in advance, and the base bracket 820 is attached to the front side frame 810 and the rear side frame 161 as an exhaust gas purifying device unit. Incidentally, the exhaust pipe 181 was connected to the oxidation catalyst device 410 in advance. Into the insertion holes provided in the fitting pieces 825b, 835b, shaft parts 852,862 of the clamp members 850,860 are to be inserted with play. For this reason, the oxidation catalyst device 410 and the selective catalytic reduction device 430 are capable of finely adjusting their positions even in a state where the shaft parts 852,862 of the clamp members 850,860 are inserted into the insertion holes, which enables positioning in a work of connecting the exhaust pipe 181 to the turbocharger 302 of the engine 301 to be performed easily.

According to the embodiment described above, the following action effects can be acquired.

(1) The exhaust gas purifying device 400 is placed above the engine 301. The exhaust gas purifying device 400 has the cylindrical oxidation catalyst device 410, the cylindrical reducing agent injection device 420, and the cylindrical selective catalytic reduction device 430. The oxidation catalyst device 410 is placed so that the central axis CL1 of the oxidation catalyst device may be oriented along the right and left direction of the vehicle. The reducing agent injection device 420 is placed so that the central axis CL2 of the reducing agent injection device 420 may be oriented along the front and rear direction of the vehicle. The selective catalytic reduction device 430 is placed so that the central axis CL3 of the selective catalytic reduction device 430 may be oriented along the front and rear direction of the vehicle. The oxidation catalyst device 410, the reducing agent injection device 420, and the selective catalytic reduction device 430 are arranged so as to have a relationship that the central axes thereof become the same in height and the selective catalytic reduction device 430 is arranged so that the central axis CL3 of the selective catalytic reduction device 430 may pass through the oxidation catalyst device 410.

Since a dimension of the exhaust gas purifying device 400 in the right and left direction can be shortened, the right and left width of the engine compartment 122E that houses the exhaust gas purifying device 400 can be shortened. With reference to FIGS. 14A and 14B, that the dimension of the exhaust gas purifying device 400 in the right and left direction can be shortened in this embodiment is explained in comparison with a comparative example.

FIGS. 14A and 14B are schematic plan views for explaining the dimension of the exhaust gas purifying device 400 in the right and left direction. In FIGS. 14A and 14B, among the devices of which the exhaust gas purifying device 400 is included, the selective catalytic reduction device 430 with a largest dimension and the oxidation catalyst device 410 with a next largest dimension are shown by rectangular solid lines, and a position of the piping connecting the two devices is shown simply by its central line of the piping. FIG. 14A schematically shows the exhaust gas purifying device 400 according to this embodiment. In this embodiment, the selective catalytic reduction device 430 is placed with its longitudinal direction oriented along the front and rear direction of the vehicle and the oxidation catalyst device 410 is placed with its longitudinal direction oriented along the right and left direction of the vehicle. That is, the central axis CL3 of the selective catalytic reduction device 430 and the central axis CL1 of the oxidation catalyst device 410 are made orthogonal to each other.

When a dimension of the oxidation catalyst device 410 in the longitudinal direction is expressed by W1 and a dimension of the selective catalytic reduction device 430 in the longitudinal direction is expressed by W2, a magnitude correlation of W1 and W2 becomes W1<W2. In this embodiment, since the selective catalytic reduction device 430 is vertically placed behind the oxidation catalyst device 410 that was transversely placed, the right and left width of the exhaust gas purifying device 400 can be roughly set to the W1.

In contrast to this, in the comparative example, as shown in FIG. 14B, the selective catalytic reduction device 430 is transversely placed, namely, is placed so that its longitudinal direction may be oriented along the right and left direction of the vehicle. If the selective catalytic reduction device 430 and the oxidation catalyst device 410 are arranged in parallel, the right and left width of the exhaust gas purifying device 400 will be decided on the basis of one device that is longer in the longitudinal direction than the other among the selective catalytic reduction device 430 and the oxidation catalyst device 410. As a result, the right and left width will be about W2 in the exhaust gas purifying device according to the comparative example, and the right and left width will become large as compared with this embodiment.

Thus, in this embodiment, among multiple post-processing devices, a first post-processing device (oxidation catalyst device 410) whose longitudinal direction is shortest is placed so as to be along the right and left direction of the vehicle, and the post-processing devices other than this (the selective catalytic reduction device 430 and the reducing agent injection device 420) are arranged behind the first post-processing device. This enables to attain shortening of the right and left width in the engine compartment 122E and thereby attain miniaturization and weight reduction of the wheel loader. Routing spaces of piping etc., such as the reducing agent supply piping 425s, the cooling water supply piping 435s, and the return piping 435r (refer to FIG. 2), can also be fully secured. Since the right and left width of the building 122 can be shortened, backward visibility from the operator cab 121 can also be improved.

(2) Since the post-processing devices of the oxidation catalyst device 410, the reducing agent injection device 420, and the selective catalytic reduction device 430 are arranged so that one virtual plane may pass through all of them, a dimension (height) of the exhaust gas purifying device 400 in the up and down direction can be shortened. As a result, a dimension (clearance) between the exhaust gas purifying device 400 and the engine 301 in the up and down direction can be lengthened, which results in the following merits.

(2-1) A heat influence from the engine 301 that is a heating element to the exhaust gas purifying device 400 can be reduced.

(2-2) Improvement in efficiency of a maintenance work, such as a replacement work of replacement parts of the engine 301 (for example, the filter of the blowby gas reducing device 750), can be aimed at.

(2-3) Since a height dimension of the building 122 can be shortened, the backward visibility from the operator cab 121 can be improved.

(3) The selective catalytic reduction device 430 is placed so that the central axis CL3 of the selective catalytic reduction device 430 may be located on either of the left side and the right side (in this embodiment, on the right side) away from the central axis CL0 of the left and the right of the vehicle. The oxidation catalyst device 410 is placed so that the center CP of the right and left width direction may be located on either of the left side and the right side (in this embodiment, on the right side) away from the central axis CL0 of the left and the right of the vehicle. Since the selective catalytic reduction device 430 and the oxidation catalyst device 410 that are placed in a L-shape in plan view are arranged being shifted to the right side of the vehicle, a routing space (space S) of the reducing agent supply piping 425s, the cooling water supply piping 435s, and the return piping 435r (refer to FIG. 2) can be sufficiently secured on the left side of the selective catalytic reduction device 430 and the oxidation catalyst device 410. Since the routing space is sufficiently securable, a work efficiency of the routing work of the piping improves.

(4) Since the opening for exhaust gas of the engine hood 140 is provided directly above the reducing agent injection device 420 and the space S, a temperature rise of the urea water in the reducing agent supply piping 425s placed in the space S can be suppressed, and degradation of quality of the urea water can be suppressed. Since a temperature rise of the cooling water in the cooling water supply piping 435s and the return piping 435r arranged in the space S can be suppressed, a temperature rise of the reducing agent injection device 420 can also be suppressed effectively. This enables to prevent degradation of a seal material in connection parts of the reducing agent injection device 420 and respective piping (425s, 435s, 435r), etc.

(5) The exhaust gas purifying device 400 has the base bracket 820 as a supporting structure body for supporting the selective catalytic reduction device 430 and the oxidation catalyst device 410. The base bracket 820 has a first arc-shaped concave part 835a that is along an outline shape of the oxidation catalyst device 410, and a second arc-shaped concave part 825a that is along an outline shape of the selective catalytic reduction device 430. The oxidation catalyst device 410 is supported by the first concave part 835a, and the selective catalytic reduction device 430 is supported by the second concave part 825a. Since this enables to hold the selective catalytic reduction device 430 and the oxidation catalyst device 410 in a form such that they sink into the base bracket 820, the dimension of the exhaust gas purifying device unit in the up and down direction configured to be a module including the base bracket 820 can be shortened.

(6) The wheel loader has a front side frame 810 for supporting the front end of the engine hood 140 of which the top board of the engine compartment 122E is comprised and a rear side frame 161 for supporting the rear end of the engine hood 140. The above-mentioned base bracket 820 is supported by the front side frame 810 and the rear side frame 161. Since a configuration that supports the exhaust gas purifying device 400 using a member for supporting the engine hood 140 is adopted, it is not necessary to attach a supporting structure for supporting only the exhaust gas purifying device 400 to the rear frame 220. This enables to reduce the number of parts and cost and enlarge a space in the engine compartment 122E.

(7) The base bracket 820 has one pair of transverse frames (parts of the transverse linking part 833 and the L-shaped frame part 834) from which both ends of the first concave parts 835a provided as one pair are suspended, and one pair of longitudinal frames (vertical frame parts 822L, 822R) from which both ends of the second concave parts 825a provided as one pair are suspended. The base bracket 820 is configured to be of an open ceiling structure in which spaces are provided between both of the one pair of first concave parts 835a and between both of the one pair of second concave parts 825a. This enables the base bracket 820 to be made lightweight. Moreover, provision of multiple openings can make it possible to extend a work space (for example, a work space of an exchange operation of replacement parts, etc.) in the surrounding.

(8) In this embodiment, the central axis CL1 of the oxidation catalyst device 410 and the central axis CL3 of the selective catalytic reduction device 430 intersect perpendicularly, and the central axis CL1 of the oxidation catalyst device 410 and the central axis CL2 of the reducing agent injection device 420 intersect perpendicularly. This enables to set all bend angles of bend sections (elbows) of the piping connecting the post-processing devices to 90 degrees. As a result, workability of assembly works can be improved. Moreover, a check work of levelness with a spirit level (leveling instrument) etc. after fixing constitutional members can also be performed easily.

The following modifications are also within a range of the present invention, and it is also possible to combine one of or multiple modifications with the above-mentioned embodiment.

First Modification

In the embodiment described above, although the example where all of the central axis CL1 of the oxidation catalyst device 410, and the central axis CL2 of the reducing agent injection device 420, and the central axis CL3 of the selective catalytic reduction device 430 are arranged to have a relationship of forming the same virtual plane that is in parallel to the horizontal ground surface, i.e., a relationship that the central axes thereof become the same in height was explained, the present invention is not limited to this. Here, "the same" includes not only "completely the same" but also "almost the same." That is, each of the central axes CL1, CL2, and CL3 may be slightly shifted in the height direction. At least, each of the post-processing devices should just be arranged so that one virtual plane may pass through the oxidation catalyst device 410, the reducing agent injection device 420, and the selective catalytic reduction device 430. This modification also includes a case where respective heights from the horizontal ground surface to the central axis CL1, the central axis CL2, and the central axis CL3 differ slightly from one another. Moreover, this modification also includes a case where the height from the horizontal ground surface to the virtual plane differs slightly from the height from the horizontal ground surface to the central axis of the post-processing device.

Second Modification

In the embodiment described above, although the example where the exhaust gas purifying device 400 including the oxidation catalyst device 410 and the selective catalytic reduction device 430 was placed being shifted to the right side so that a center of the exhaust gas purifying device 400 in the right and left direction may be located on the right side was explained, this invention is not limited to this. The exhaust gas purifying device 400 may be placed being located on the left side, or may be placed with a central axis that divides the right and left width of the exhaust gas purifying device 400 into two parts being adjusted to the central axis CL0 of the vehicle.

Third Modification

Although in the embodiments described above, the examples where the aqueous solution of urea is used as the reducing agent, the present invention is not limited to this. The present invention is applicable to a work vehicle having the exhaust gas purifying device 400 that uses various reducing agents, such as ammonia aqueous solution.

Fourth Modification

Although in the embodiment described above, the example where the present invention was applied to the wheel loader, the present invention is not limited to this and the present invention can be applied to various work vehicles, such as a wheel type hydraulic shovel.

In the above, although various embodiments and modifications were explained, the present invention is not limited to their contents. Other modes that are considerable within a range of technical ideas of the present invention are also included within the range of the present invention.

What is claimed is:

1. A work vehicle having an engine compartment accommodating an engine and an exhaust gas purifying device for purifying exhaust gas of the engine in an engine compartment, the work vehicle having a right to left direction, a front to rear direction, a top to bottom direction and a central axis along the front to rear direction;
    a cooler compartment partitioned from the engine compartment by a partition wall,
        wherein the exhaust gas purifying device is placed above the engine, and comprises a cylindrical oxidation catalyst device, a cylindrical reducing agent injection device, and a cylindrical selective catalytic reduction device,
        wherein a reducing agent tank that stores a reducing agent to be supplied to the reducing agent injection device via a reducing agent supply piping is disposed in the cooler compartment,
    wherein the oxidation catalyst device is positioned with a central axis of the oxidation catalyst device oriented along the right to left direction of the work vehicle and having a center point along the right to left direction,
    wherein the reducing agent injection device is positioned with a central axis of the reducing agent injection device oriented along the front to rear direction of the work vehicle,
    wherein the selective catalytic reduction device is positioned with a central axis of the selective catalytic reduction device oriented along the front to rear direction of the work vehicle,
    wherein the oxidation catalyst device, the reducing agent injection device, and the selective catalytic reduction device are arranged so as to have a relationship that the central axes thereof have heights along the top to bottom direction of the work vehicle that are the same,
    wherein the central axis of the selective catalytic reduction device and the central axis of the oxidation catalyst device are orthogonal to each other,
    wherein the central axis of the selective catalytic reduction device is positioned to pass through the oxidation catalyst device,
    wherein the selective catalytic reduction device is positioned to have the central axis of the selective catalytic reduction device is located on one side of the work vehicle away, in the right to left direction, from the central axis along the front to rear direction of the work vehicle, and
    wherein the oxidation catalyst device is positioned to have the center point of the oxidation catalyst device is located on one side of the work vehicle away from the central axis.

2. The work vehicle according to claim 1, further comprising a supporting structure body for supporting the selective catalytic reduction device and the oxidation catalyst device,
    wherein the supporting structure body has a first arc-shaped concave part that is along an outline shape of the oxidation catalyst device and a second arc-shaped concave part that is along an outline shape of the selective catalytic reduction device,
    wherein the oxidation catalyst device is supported by the first concave part, and
    wherein the selective catalytic reduction device is supported by the second concave part.

3. The work vehicle according to claim 2, further comprising a front side frame for supporting a front end of a top board of the engine compartment and a rear side part for supporting a rear end of the top board,
    wherein the supporting structure body is supported by the front side frame and the rear side frame.

4. The work vehicle according to claim 2, wherein the supporting structure body has one pair of transverse frames that suspend respective both ends of the first concave parts that are provided to make one pair and one pair of vertical frames that suspend respective both ends of the second concave parts that are provided to make one pair.

* * * * *